(12) United States Patent
Southwell et al.

(10) Patent No.: US 6,883,067 B2
(45) Date of Patent: Apr. 19, 2005

(54) EVALUATION AND OPTIMIZATION OF CODE

(75) Inventors: Trefor Southwell, Bristol (GB); Peter Hedinger, Bristol (GB); Kristen Jacobs, Bristol (GB)

(73) Assignee: STMicroelectronics Limited, Bristol (GB)

( * ) Notice: Subject to any disclaimer, the term of this patent is extended or adjusted under 35 U.S.C. 154(b) by 400 days.

(21) Appl. No.: 10/072,814

(22) Filed: Feb. 8, 2002

(65) Prior Publication Data

US 2003/0154342 A1 Aug. 14, 2003

(51) Int. Cl.$^7$ ............................................. G06F 12/00
(52) U.S. Cl. ........................ 711/118; 711/165; 711/156
(58) Field of Search ................................ 711/118, 165, 711/156

(56) References Cited

U.S. PATENT DOCUMENTS

| | | | | |
|---|---|---|---|---|
| 5,630,097 A | * | 5/1997 | Orbits et al. ................. | 711/165 |
| 5,862,385 A | * | 1/1999 | Iitsuka ........................ | 717/156 |
| 5,940,618 A | * | 8/1999 | Blandy et al. ............... | 717/128 |
| 5,963,972 A | * | 10/1999 | Calder et al. ................ | 711/129 |
| 6,272,599 B1 | * | 8/2001 | Prasanna ..................... | 711/138 |
| 2003/0097538 A1 | * | 5/2003 | Hall et al. ................... | 711/201 |

* cited by examiner

*Primary Examiner*—Kimberly McLean-Mayo
(74) *Attorney, Agent, or Firm*—Lisa K. Jorgenson; E. Russell Tarleton; Seed IP Law Group PLLC

(57) ABSTRACT

A memory map evaluation tool is provided that organizes a program in a manner most compatible with use of a cache. The tool includes a method that involves executing a first version of the program according to a first memory map to generate a program counter trace, converting the program counter trace into a specific format and then translating the program counter trace into physical addresses using a memory map to be evaluated, different from the first memory map. Those physical addresses are then used to evaluate the number of likely cache misses using a model of a direct-mapped cache for the memory map under evaluation.

14 Claims, 5 Drawing Sheets

EVALUATION AND OPTIMIZATION OF CODE

BACKGROUND OF THE INVENTION

The present invention relates to the evaluation and optimization of code, particularly to be used in a processor including a cache.

1. Field of the Invention

The present invention relates to the evaluation and optimisation of code, particularly to be used in a processor including a cache.

2. Description of the Related Art

In the field of computer systems, cache memories and their use are well known. However, a brief discussion follows in so far as is necessary to fully understand this invention.

Caches are high-cost, high-speed memories that provide an important performance optimization in processors. This is done by keeping copies of the contents of most commonly used locations of main memory near to the processor, namely in cache locations. As a result, accesses to the contents of these memory locations are much quicker.

The instruction cache is responsible for optimizing accesses to the program being executed. The cache will usually be smaller than the size of the program, meaning that the contents of the cache will need to change to ensure that the parts of the program currently being executed are in the cache.

In designing the instruction cache a trade-off between cost and performance has to be made. Two of the key parameters that can be changed are the cache's size and associativity. These both influence the resulting silicon area and maximum clock frequency of the cache.

The size of a cache is determined by a number of factors, but will depend primarily on area limitations and target applications of the design.

Determining the appropriate level of associativity of the cache can be harder.

For a direct-mapped cache, each block in main memory maps to a unique location (line) in the cache. That is a "block" in memory is a chunk of data corresponding in size to a cache location. If two blocks map to the same line then they cannot be in the cache at the same time and will continually replace each other. This case is referred to as a conflict.

For a set-associative cache, each block maps to a set of lines. The block can be stored in any of the lines in the set. Note that because the number of lines in the cache is constant, dividing the cache into sets moans that more blocks map to each set. In general, the cache will be more effective with a reasonable level of associativity because it can decide which lines it will replace and which lines will be kept.

However, there are at least two reasons why a direct-mapped cache may be chosen, namely higher potential clock frequency and smaller area than a set-associative cache of the same size.

The disadvantage of a direct-mapped instruction cache is that conflicting addresses can cause large performance loss. As an example consider a real graphics application in an MPEG decoder. The graphics application includes a number of different functions, and in particular a variable length decode (VLD) and an inverse discrete cosine transform (IDCT) function which are used extremely often and in fact often in sequence on each new data set. That is, it is almost sure that if one is used, the other will be used subsequently in a short space of time. If they were to map to the same lines in the cache then there would be a conflict each time execution moves from one function to the other.

The results of such conflicts are performance losses as the code would have to be loaded from memory every time it was needed, and an increase of bus traffic.

The most common way of ensuring that there are no performance critical conflicts is to use a set-associative cache. This reduces the chances of conflicts dramatically, as the number of conflicting blocks must be greater than the number of lines in the set for the same performance loss to occur.

Another way of reducing the impact of conflicts is to use a victim cache. This will normally be a small, fully associative cache that stores the last few entries that have been evicted from the main cache. This can be an effective way of coping with a small number of conflicts. However, the effectiveness will vary highly depending on the size of the victim cache and the application being run.

The disadvantage of both of these solutions is that they impose hardware constraints on the design. The set-associative cache requires more silicon area and will limit the processor's maximum clock frequency. Using a victim cache increases the silicon area.

It is an aim of the present invention to reduce or eliminate conflicts in a direct-mapped cache to allow advantage to be taken of the smaller area and higher clock frequencies characteristic of such caches.

BRIEF SUMMARY OF THE INVENTION

According to the disclosed embodiments of the invention, there is provided a method of evaluating a set of memory maps for a program comprising a plurality of functions, the method comprising: (a) executing a first version of the program according to a first memory map to generate a program counter trace; (b) converting the program counter trace into a format defining a memory location in association with a function and an offset within the function using the first memory map; (c) translating the program counter trace into physical addresses using one of the set of memory maps to be evaluated, different from the first memory map; (d) evaluating the number of likely cache misses using a model of a direct-mapped cache for that one memory map; and repeating steps (c) and (d) for each of the memory maps in the set.

Another aspect provides a method of operating a computer to evaluate a set of memory maps for a program comprising a plurality of functions, the method comprising: loading a first version of the program into the computer and executing said first version to generate a program counter trace; loading into the computer a memory map evaluation tool which carries out the steps of: converting the program counter trace into a format defining a memory location in association with a function and an offset within the function using the first memory map; translating the program counter trace into physical addresses using one of the set of memory maps to be evaluated, different from the first memory map; and evaluating the number of likely cache misses using a model of a direct-mapped cache for that one memory map; wherein the step of translating a program counter trace and evaluating the number of likely cache misses is repeated for each of the memory maps in a set to be evaluated.

Another aspect provides a memory map evaluation tool comprising: a first component operable to generate a program counter trace from execution of a first version of a program according to a first memory map and to provide from that program counter trace a converted format defining a memory location in association with a function and an offset within the function using the first memory map; and a second component operable to translate the program counter trace into physical addresses using one of the set of memory maps to be evaluated, different from the first memory map, and to evaluate the number of likely cache misses using a model of a direct-mapped cache for that one memory map under evaluation.

For a better understanding of the present invention and to show how the same may be carried into effect, reference will now be made by way of example to the accompanying drawings.

DETAILED DESCRIPTION OF THE INVENTION

Figure 1:
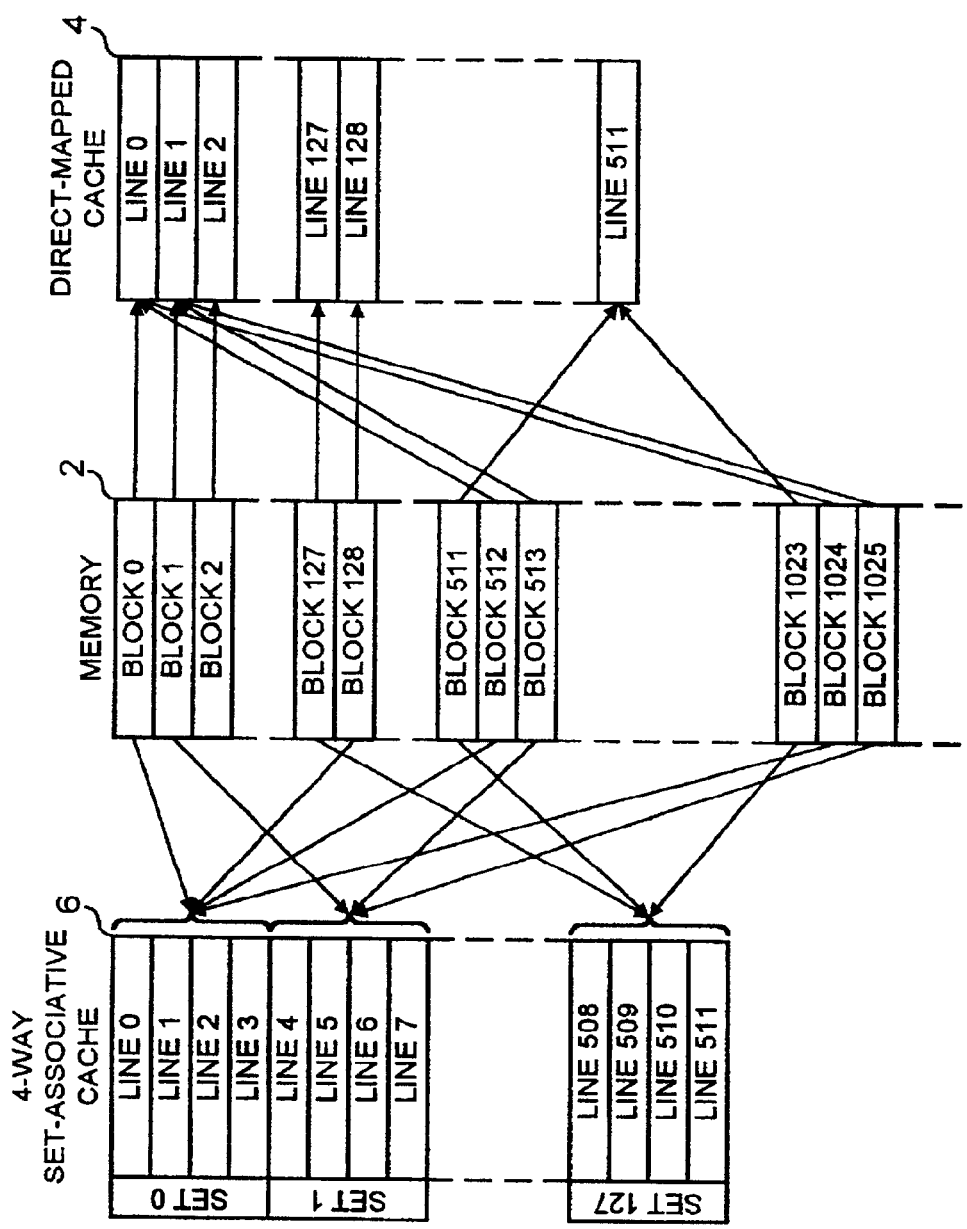
FIG. 1 is a schematic diagram illustrating mapping between a memory and a direct-mapped cache and a four way set associative cache.

FIG. 1 illustrates the relationship between memory locations and cache lines in a four way set associative cache and a direct-mapped cache. The main memory is denoted by reference numeral 2 shown to have a plurality of program blocks. A direct-mapped cache is denoted by reference numeral 4 and is shown with a plurality of numbered cache lines. Each block maps onto a single cache line only, with the result that several different blocks all map exclusively onto the same cache line. Consider for example blocks 1,513 and 1025 which all map onto line 1 of the cache.

Reference numeral 6 denotes a four way set associative cache from which it can be seen that each block maps onto a plurality of lines in the cache. In particular blocks 1,513 and 1025 all map onto Set 1 but there are four lines to choose from within the set where the contents of those locations at main memory could be held.

The potential difficulty with the direct-mapped cache 4 that does not exist in the four way set associative cache can readily be seen from FIG. 1. That is, if block 1 is in the direct-mapped cache 4 (at line 1) and then block 513 is to be executed, the only location in the cache suitable for accepting block 513 is line 1, which requires the eviction of block 1. If block 1 (or indeed block 513) is not often used, this is probably not too much of a problem. However, in programs where block 513 is often used, and in particular is often used after block 1, this requires more or less constant cache eviction and replacement which affects performance and increases bus traffic as discussed above.

Figure 2:
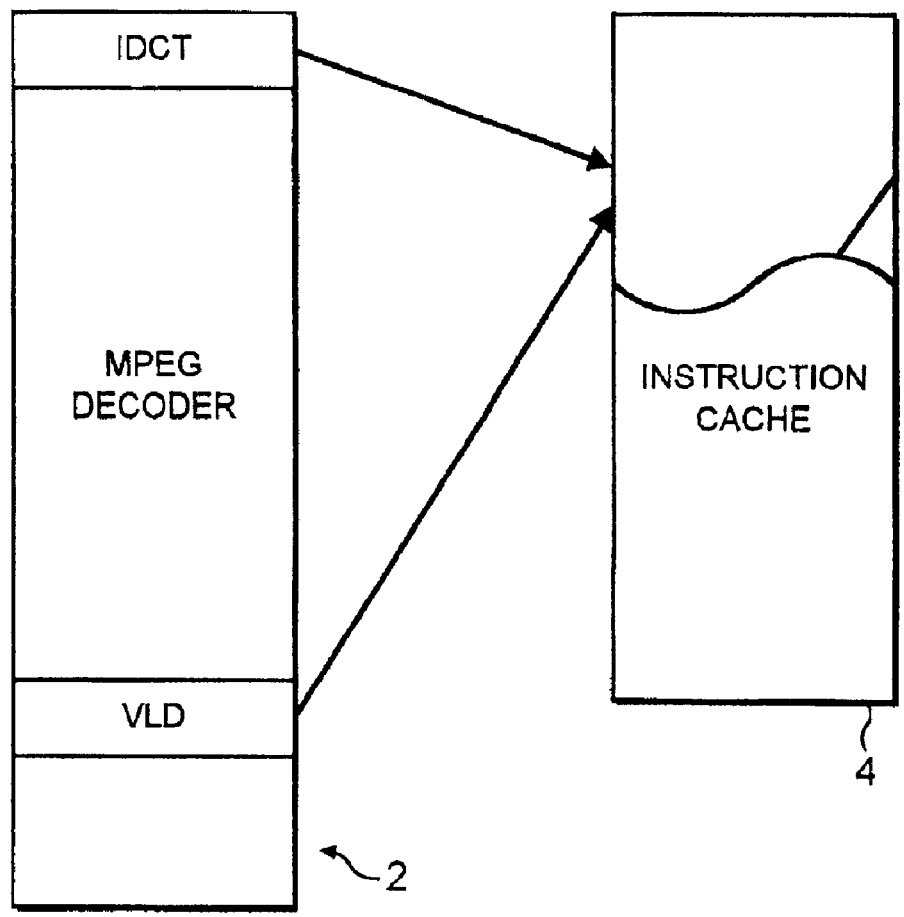
FIG. 2 is an example of an MPEG decoder application stored in memory and its mapping to a cache.

FIG. 2 is an example of an MPEG decoder application stored in a main memory 2 and including a variable length decode function (VLD) and an inverse discrete cosine transform (IDCT). Assume, as shown by the arrows, that these functions relate to blocks which map onto the same line or lines in the instruction cache 4. Due to the frequent usage of these functions within the decoder application, this would be a situation where a direct-mapped cache would be ineffective.

The software tool discussed in the following, however, allows a direct-mapped cache to be used in such a situation without a negative impact on performance.

In brief, the tool changes the memory map of a program in order to minimize conflicts and hence increase performance. Creating a new memory map simply means placing the functions in a new order in memory legend.

Figure 3:
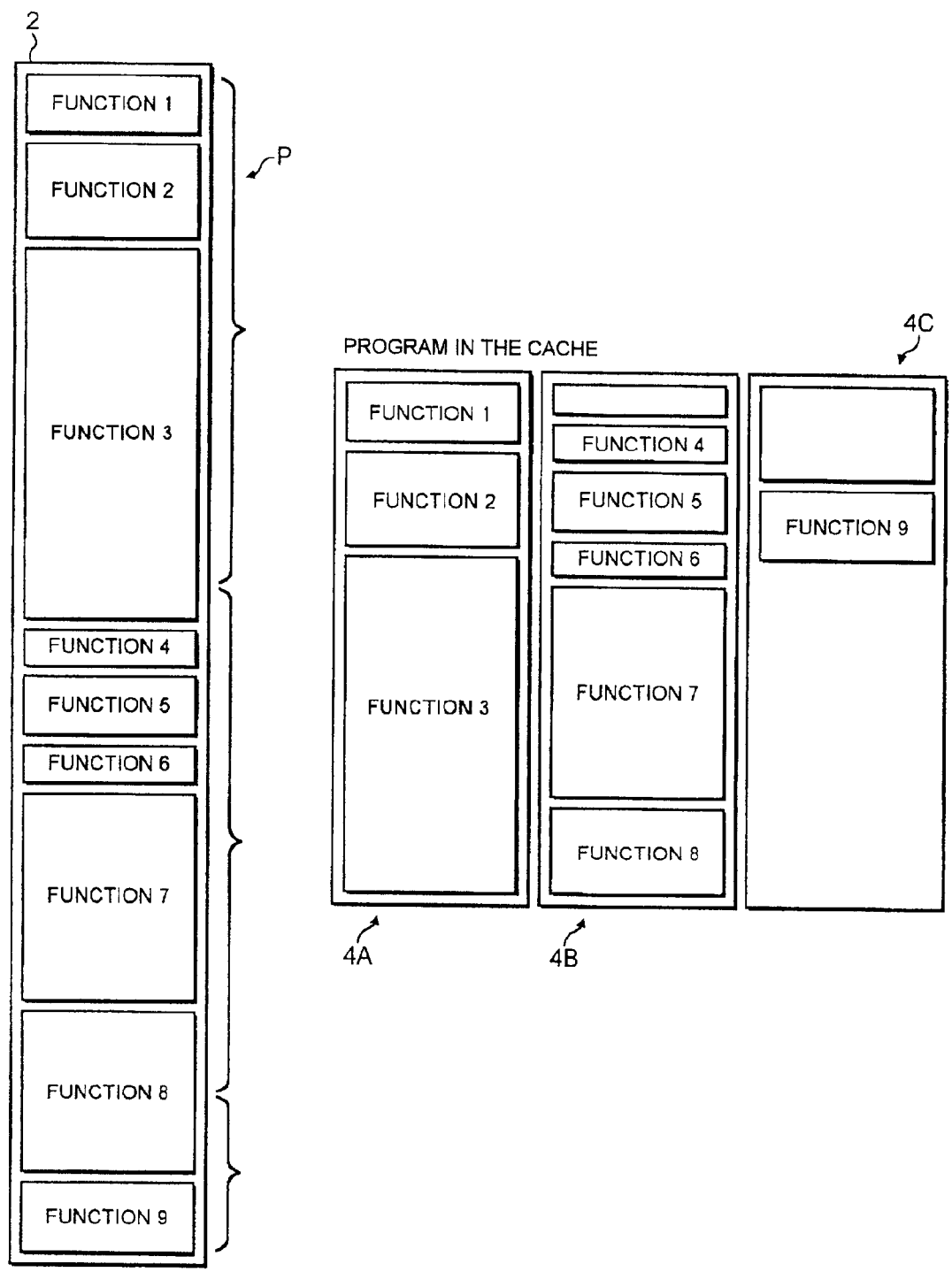
FIG. 3 is an example of a memory map.

FIG. 3 illustrates a program P comprising a plurality of functions labelled Function 1, Function 2 etc. of differing sizes held in a memory 2. The blocks labelled 4A, 4B and 4C each represent the full direct-mapped cache and illustrate the mapping of the program functions in the cache. From this it can be seen that, for example, Function 1 maps onto the same cache lines as the end part of Function 3 and the end part of Function 8. Equivalent mappings can be seen further from the block 4A, 4B and 4C in FIG. 3. The software tool discussed herein alters the order of the functions of the program as stored in the memory 2 such that their relative mapping into the cache differs to negate or reduce conflicts.

Figure 4:
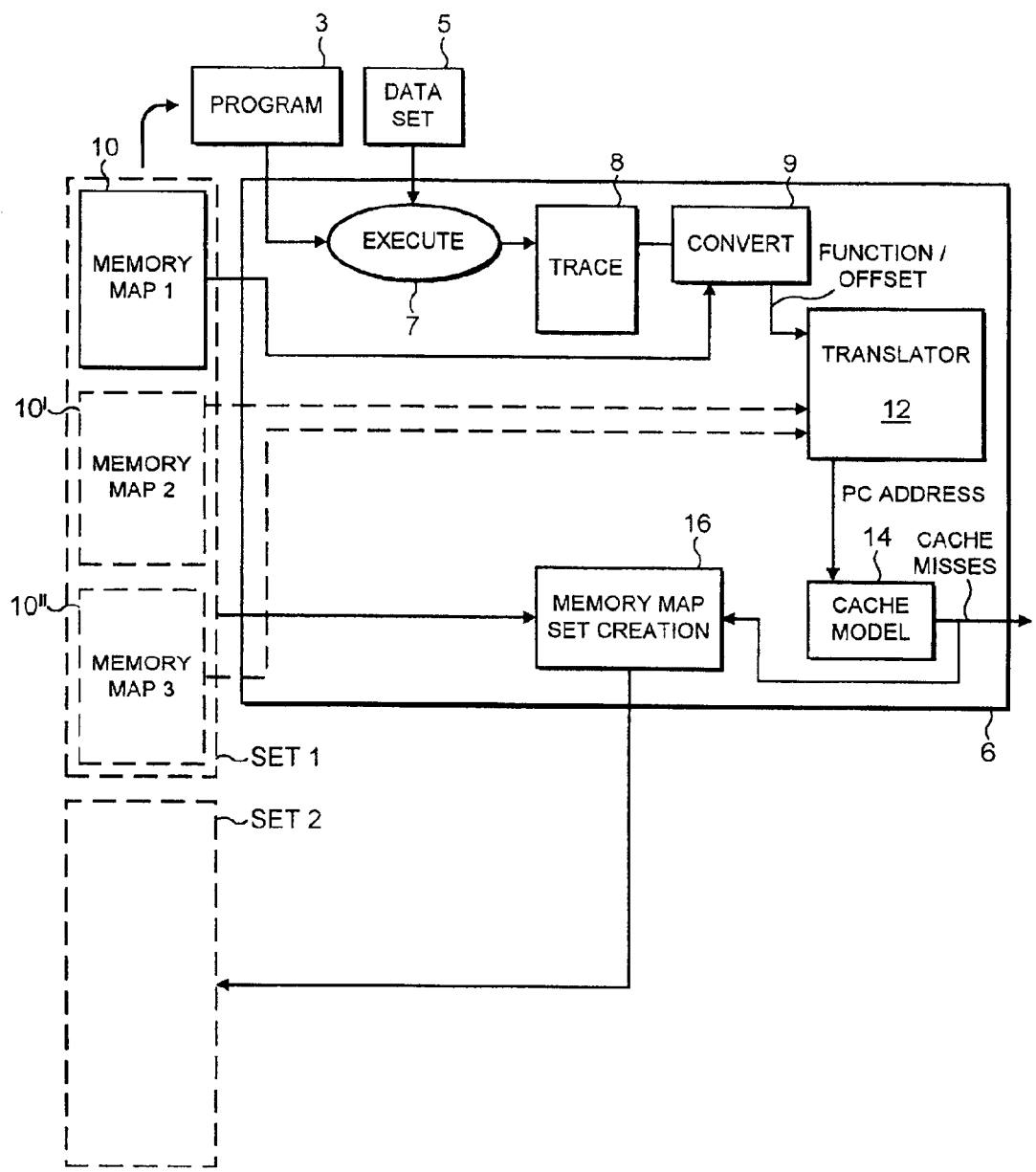
FIG. 4 is a schematic block diagram of a software tool for altering a memory map to improve cache mapping.
Figure 5:
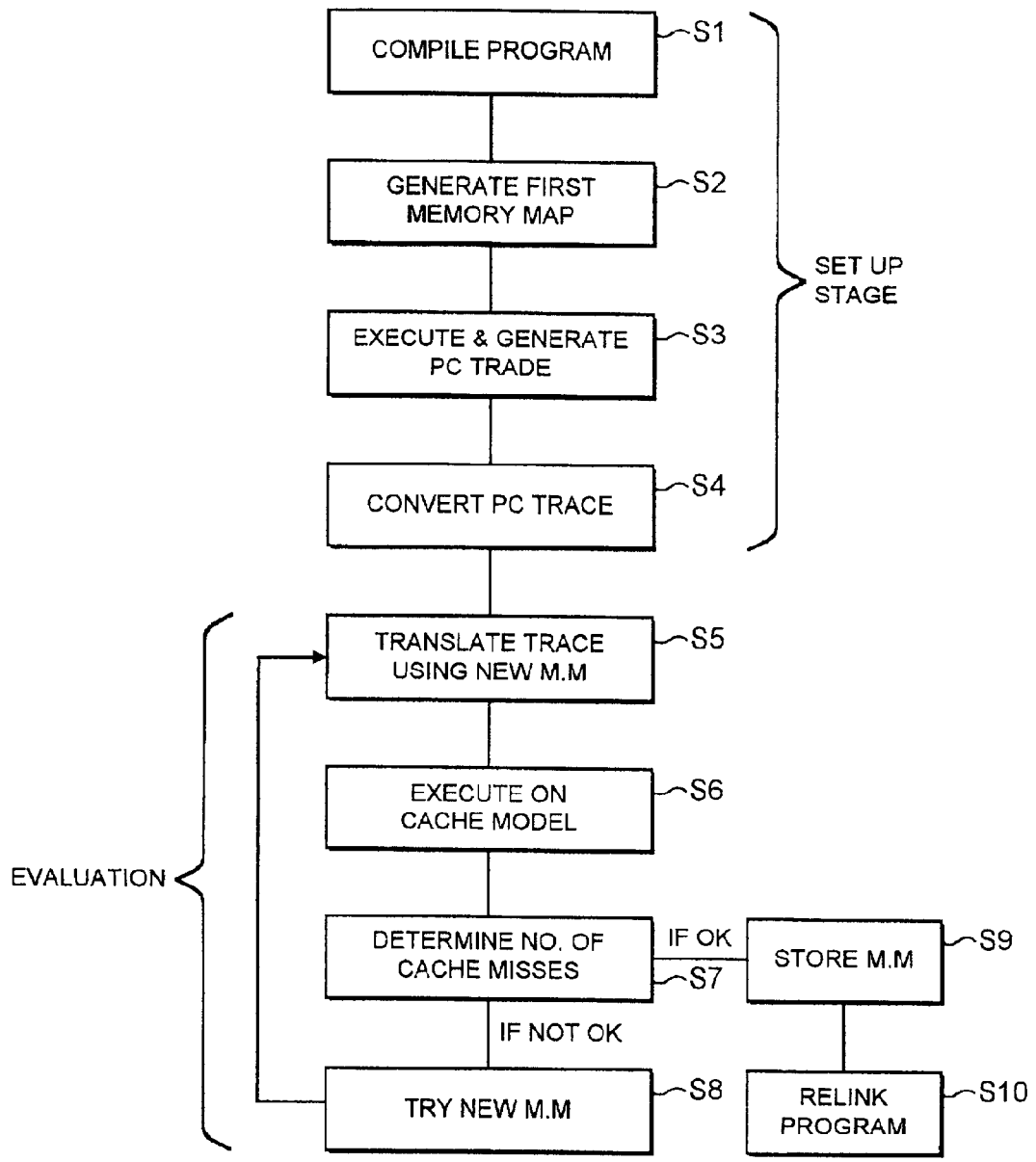
FIG. 5 is a flow chart illustrating operation of the tool of FIG. 4.

An extremely effective method of optimizing the mapping for the instruction cache relies on the ability to generate traces of the Program Counter (PC) as the program 3 executes on a typical data set 5. FIG. 4 illustrates a memory mapping tool 6 which works in this way where the execution is denoted by an execute block 7, and FIG. 5 in a flow diagram.

Initially, a program 3 is compiled (Step S1), its memory map 10 generated (by a linker at link time—Step S2) and then executed (S3) on a typical data set 5. A PC trace 8 is produced following this execution.

The trace 8 is converted (S4) to a function/offset format using the first memory map 10 of the program. For example, if the idct function (see FIG. 2) started at address 0x08003ba0, the address 0x08003ba8 would become idct 0x08. See Table 1 below.

TABLE 1

| Program Counter Trace | Annotated trace<br>Format: function offset |
|---|---|
| 0x080011f4 | main 0x50 |
| 0x08003ba0 | Idct 0x00 |
| 0x08003ba4 | Idct 0x04 |
| 0x08003ba8 | Idct 0x08 |
| 0x08003bac | Idct 0x0c |
| 0x080011f8 | main 0x54 |
| 0x080011fc | main 0x58 |
| 0x080046f8 | exit 0x00 |
| 0x080046fc | exit 0x04 |
| 0x08004700 | exit 0x08 |

The tool 6 uses this trace format to explore new memory maps (labelled Memory Map 1 (10), Memory Map 2 (10'), and memory map 3 (10")  in FIG. 4), looking for one that generates the minimum number of instruction cache misses. This process of exploration has the advantage that the time to evaluate each memory map is much quicker than actually re-linking and benchmarking the program.

Evaluating a memory map (Step S5) is done by translating the function/offset trace 8 (e.g. "main 0x58") back to physical PC addresses by translator 12 and passing them through a simple cache model (Step S6). The physical address of each function is calculated using each memory map 10', 10"

to be evaluated and the code size of each function. The physical PC addresses can then be calculated by simply adding the offset to the base physical address of the function given in the memory map under evaluation.

The cache model 14 counts the total number of cache misses (Step S7) that would be caused if the application were to be re-linked and run on the actual hardware with the given memory map. The results are stored and compared with results for subsequently evaluated memory maps so that the memory map giving the least number of misses can be identified. That memory map is stored and used to relink the program (S10).

A very basic generic algorithm is to explore potential memory maps for the one with the best performance. The user chooses the number of memory maps 10, 10', 10" in the set SET 1 to be explored on each iteration, and criteria for terminating the search by the tool 6.

At the start, each of the memory maps in the set is randomized. Then the tool iterates until the end criteria are met.

A single iteration consists of two stages: evaluating the performance of each memory map in the set and creating a new set of memory maps for the next iteration.

The memory maps are evaluated as described above, with the number of misses being used as the measure of performance. The less misses, the less time the program would spend stalled on the hardware.

Once the memory maps in the set have been evaluated, the aim is to create new memory maps that reduce the number of misses. The best memory map found so far will always be kept, while the rest of the memory maps will be replaced with new ones. The new ones are created using three techniques:

Random swap—Take the best memory map and perform a swap of two random functions.

Merging—If two or more memory maps on this iteration have improved on the previous best then merge the changes of each.

Target functions—Misses can be classified as either: Compulsory—misses that would occur even in an infinite cache because the code has to be loaded in before it is executed. Conflict—misses that would not have occurred in a fully associative cache of the same size. Capacity—all other misses are simply due to the size of the cache. Those that can be eliminated are the conflict misses which are usually caused by functions clashing with each other. In order to eliminate these misses, functions that are causing the most conflict misses are targeted for swapping.

The tool stops iterating once the user's end criteria has been met. This may be after a number of iterations, or a set number of misses has been reached, or the tool has failed to find a better memory map for a number of iterations.

On exit, the tool dumps the memory map of the optimal solution found so that the real program can be linked using that memory map. It also reports the total number of misses that should be produced by the memory map, and the number of compulsory misses there are (due to total code size executed). The ratio of the total misses to compulsory misses gives a good indication of the effectiveness of the tool.

This software optimization method is not guaranteed to work for all applications, but there are many suitable applications where this optimization method can be used effectively, allowing direct-mapped caches to be used.

Essentially, optimizing a program for the instruction cache will work well if the program demonstrates repeatable execution flow. This is true of many streaming data (audio/video) applications, where typical data sets can be used to determine the execution flow of the application.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of evaluating a set of memory maps for a program having a plurality of functions, the method comprising:

(a) executing a first version of the program according to a first memory map to generate a program counter trace;

(b) converting the program counter trace into a program counter trace format defining a memory location in association with a function and an offset within the function using the first memory map;

(c) translating the program counter trace format into physical addresses using one of the set of memory maps to be evaluated, different from the first memory map;

(d) evaluating the number of likely cache misses by passing the physical addresses for that one memory map to a model of a direct-mapped cache; and repeating steps (c) and (d) for each of the memory maps in the set.

2. The method of claim 1, wherein step (c) is carried out by utilizing the base address of each function of said one of the memory maps to be evaluated with the offset given in the program count trace format.

3. The method of claim 1, wherein the direct-mapped cache model of step (d) emulates the operation of a cache such that would occur when a new version of the program linked according to said one memory map under evaluation is executed.

4. The method of claim 1, comprising the additional step of, subsequent to evaluating the first set of memory maps, generating a further set of memory maps for evaluation.

5. A method of operating a computer to evaluate a set of memory maps for a program comprising a plurality of functions, the method comprising:

loading a first version of the program into the computer and executing said first version to generate a program counter trace;

loading into the computer a memory map evaluation tool that carries out the steps of:

converting the program counter trace into a program counter trace format defining a memory location in association with a function and an offset within the function using the first memory map;

translating the program counter trace format into physical addresses using one of the set of memory maps to be evaluated, different from the first memory map; and evaluating the number of likely cache misses by passing the physical addresses for that one memory map to a model of a direct-mapped cache;

wherein the step of translating a program counter trace and evaluating the number of likely cache misses is repeated for each of the memory maps in a set to be evaluated.

6. The method of claim 5, wherein the memory map generation tool is also operable to generate a further set of memory maps for evaluation taking into account the results of evaluation of the first set of memory maps.

7. A memory map evaluation tool comprising:
   a first component operable to generate a program counter trace from execution of a first version of a program according to a first memory map and to provide from that program counter trace a converted format defining a memory location in association with a function and an offset within the function using the first memory map; and
   a second component operable to translate the converted format of the program counter trace into physical addresses using one of the set of memory maps to be evaluated, different from the first memory map, and to evaluate the number of likely cache misses by passing the physical addresses for that one memory map under evaluation to a model of a direct-mapped cache.

8. The tool of claim 7, configured in the form of program code means which, when executed on a computer, carry out the method steps of:
   (a) executing a first version of the program according to a first memory map to generate a program counter trace;
   (b) converting the program counter trace into a format defining a memory location in association with a function and an offset within the function using the first memory map;
   (c) translating the program counter trace into physical addresses using one of the set of memory maps to be evaluated, different from the first memory map;
   (d) evaluating the number of likely cache misses using a model of a direct-mapped cache for that one memory map; and
   repeating steps (c) and (d) for each of the memory maps in the set.

9. A method of optimizing memory mapping for an instruction cache having an original memory map, comprising:
   generating a plurality of alternate memory maps;
   evaluating each of the plurality of alternate memory maps for the potential number of misses resulting from cache memory conflicts;
   selecting at least one of the evaluated plurality of alternate memory maps and in accordance with predetermined criteria;
   generating new alternate memory maps from the selected at least one of the evaluated plurality of alternate memory maps and the original map;
   evaluating the new alternate memory maps; and
   repeatedly generating and evaluating new alternate memory maps until an end criteria is met;
   wherein the end criteria comprises one from among: a predetermined number of memory maps that have been evaluated, failure to find a better memory map, and when a number of misses is greater than a predetermined minimum number of misses.

10. A method of optimizing memory mapping for an instruction cache having an original memory map, comprising:
    generating a plurality of alternate memory maps;
    evaluating each of the plurality of alternate memory maps for the potential number of misses resulting from cache memory conflicts;
    selecting at least one of the evaluated plurality of alternate memory maps and in accordance with predetermined criteria;
    generating new alternate memory maps from the selected at least one of the evaluated plurality of alternate memory maps and the original map;
    evaluating the new alternate memory maps; and
    repeatedly generating and evaluating new alternate memory maps until an end criteria is met;
    wherein generating new alternate memory maps comprises one from among the following: swapping functions from the selected at least one of the plurality of alternate memory maps and the original memory map, and selecting at least two of the alternate memory maps and merging the selected at least two of the alternate memory maps with the original memory map.

11. A software optimization method, comprising:
    compiling a program;
    generating a first memory map;
    executing the program and generating a program count trace;
    converting the program count trace to a program count trace format for finding a memory location in association with a function and an offset within the function using the first memory map; and
    evaluating and selecting a memory map, further comprising:
    translating the program counter trace format into physical addresses;
    executing the translated trace on a cache model using the physical addresses;
    determining the number of cache misses; and
    when the number of cache misses is acceptable, selecting the memory map and relinking to the program, otherwise selecting a new memory map and returning to the substep of translating the program count trace using the new memory map.

12. A software optimization method, comprising:
    selecting a plurality of memory maps for evaluation and end criteria for terminating the evaluation;
    evaluating each of the memory maps until the end criteria for terminating the evaluation is met, further comprising:
    evaluating the performance of each selected memory map; and
    creating a new set of memory maps from the memory maps previously evaluated for a next evaluation;
    wherein creating a new set of memory maps comprises selecting the memory map with the least number of misses resulting from cache memory conflicts and performing a swap of two random functions therein.

13. A software optimization method, comprising:
    selecting a plurality of memory maps for evaluation and end criteria for terminating the evaluation;
    evaluating each of the memory maps until the end criteria for terminating the evaluation is met, further comprising:
    evaluating the performance of each selected memory map; and
    creating a new set of memory maps from the memory maps previously evaluated for a next evaluation;
    wherein creating a new set of memory maps comprises selecting two or more memory maps having the best performance from the previous evaluation and merging the changes from the two selected memory maps to create a new memory map.

14. A software optimization method, comprising:

selecting a plurality of memory maps for evaluation and end criteria for terminating the evaluation;

evaluating each of the memory maps until the end criteria for terminating the evaluation is met, further comprising:

evaluating the performance of each selected memory map; and creating a new set of memory maps from the memory maps previously evaluated for a next evaluation;

wherein the end criteria comprises one from among: a set number of evaluations that have been performed, a set number of misses that have been reached, and failure to find a better memory map after a predetermined number of evaluations.

* * * * *